Figure 1:
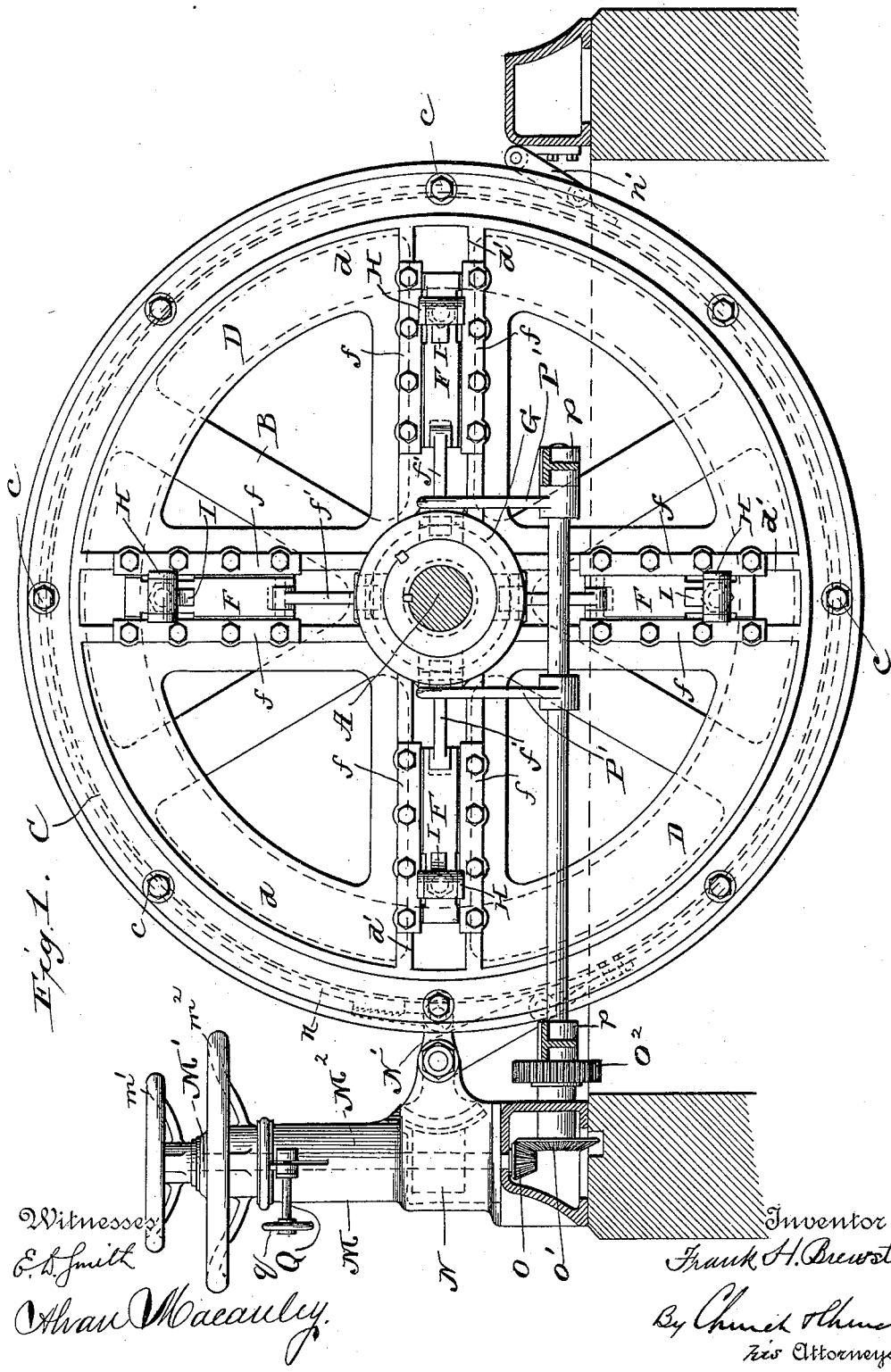

(No Model.) 2 Sheets—Sheet 1.

F. H. BREWSTER.
FRICTION CLUTCH.

No. 463,350. Patented Nov. 17, 1891.

Witnesses
E. D. Smith
Alvan Macauley.

Inventor
Frank H. Brewster
By Church & Church
his Attorneys (No Model.) 2 Sheets—Sheet 2.
F. H. BREWSTER.
FRICTION CLUTCH.
No. 463,350. Patented Nov. 17, 1891.
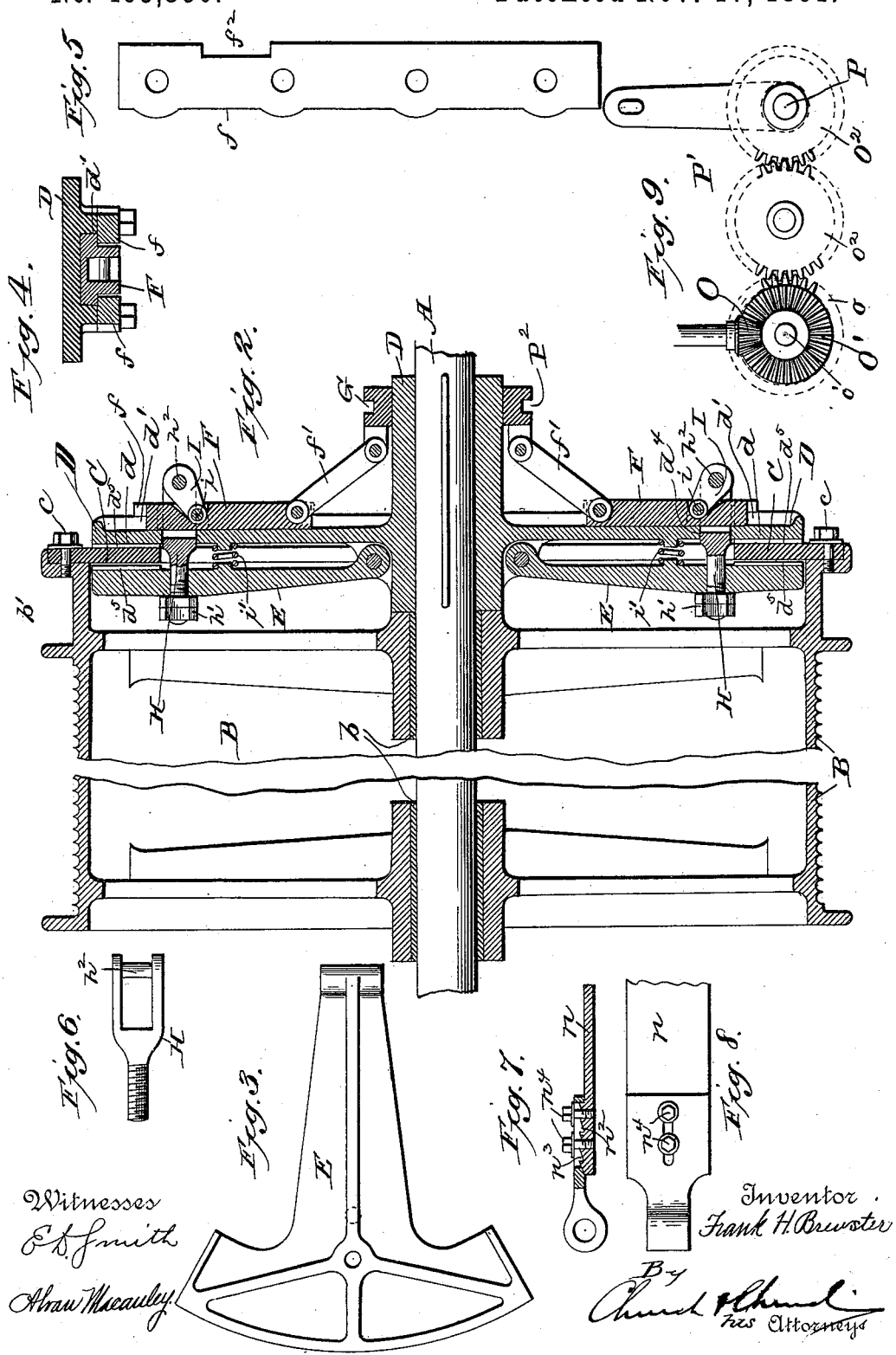
Witnesses
E. L. Smith
Alvan Macauley
Inventor
Frank H. Brewster
By Church & Church
his Attorneys

UNITED STATES PATENT OFFICE.

FRANK H. BREWSTER, OF ESCANABA, MICHIGAN.

FRICTION-CLUTCH.

SPECIFICATION forming part of Letters Patent No. 463,350, dated November 17, 1891.

Application filed March 25, 1891. Serial No. 386,325. (No model.)

*To all whom it may concern:*

Be it known that I, FRANK H. BREWSTER, of Escanaba, in the county of Delta and State of Michigan, have invented certain new and useful Improvements in Friction-Clutches; and I do hereby declare the following to be a full, clear, and exact description of the same, reference being had to the accompanying drawings, forming a part of this specification, and to the letters of reference marked thereon.

This invention relates to improvements in friction-clutches particularly designed for use in connection with hoisting-drums for mines, elevators, &c., also adapted for use in connection with any machinery employing friction-clutches.

The objects of the invention are to provide a simple powerful clutch mechanism which may be adjusted to a nicety and which will permit of the employment of a perfectly-balanced drum, a further object being to provide a mechanism adapted to grip a friction-rim from both sides when the clutch is thrown into operative position, thereby preventing any lateral strains on the drum or shaft, and further giving an extended friction-surface, which may be regulated to suit work to be done by the clutch.

The invention consists, broadly stated, in a friction-surface having a movement longitudinally of the shaft with a radially-sliding carriage and connections between said carriage and surface for moving the same, with means for giving the carriage its radial movement and in a more limited form.

The invention consists in a pair of friction-surfaces operating longitudinally of the shaft to grip a friction-rim with radially-sliding carriages on one of said surfaces and connections between said carriage and the opposite surface for imparting thereto the necessary movement, and means for moving the carriage radially.

Finally, the invention consists in certain novel details of construction and combinations and arrangements of parts to be hereinafter described, and pointed out particularly in the claims at the end of this specification.

In the accompanying drawings, Figure 1 is an end elevation of a clutch and hoisting-drum constructed in accordance with my present invention, the bed-plate and brackets of the shipper-shaft bearings being broken away to show the clutch more completely. Fig. 2 is a longitudinal section through the drum and clutch. Fig. 3 is a detail elevation of one of the movable clutch members. Fig. 4 is a section through one of the radially-sliding carriages and its guide. Fig. 5 is a detail of one of the cap-plates for the carriage-guide. Fig. 6 is a detail of the clevis; Figs. 7 and 8, details of the connection between the brake-band and its operating segment, and Fig. 9 a diagrammatic illustration of the connection between the shipper-shaft and the shaft of the hand-wheel.

Similar letters of reference in the several figures indicate the same parts.

The main shaft A, to which the power is applied in the present instance, has journaled loosely thereon the winding-drum B, suitable bushings $b$, of brass or similar material, being provided to prevent excessive wear, and at one end this drum is provided with a brake-band recess $b'$ of usual construction, and preferably at the same end is formed or provided with an inwardly-projecting flange C, constituting one of the clutch members, and which, for convenience, may consist of a separate annular plate secured in place by bolts $c$ or otherwise. Mounted, also, on the main shaft A and keyed thereto is a hub and wheel D, the rim $d$ of which lies in proximity to and parallel with the surface of the clutch-rim C. The wheel D has mounted thereon by suitable pivotal connections one or more—preferably four, as shown—movable clutch-segments E, the extended ends of which lie in proximity to the opposite side of the clutch-rim, the said segments and clutch-wheel being adapted to grip or bear against the opposite sides of the said rim through the medium of mechanism to be now described and constitute the movable members of the clutch.

In each, or as many as necessary, of the spokes of the clutch-wheel D are formed guides or ways $d'$, in which are mounted radially-movable carriages F, being held in place by cap-plates $f$, and to the inner ends of these carriages are connected toggle-links $f'$, which are in turn connected to the sliding collar G, mounted on the shaft, or preferably on the extended hub of the wheel D. This collar, it will be understood, is the medium through which the clutch-sections are thrown into or out of operation, the collar being adapted to be moved longitudinally of the shaft by mechanism to be presently described.

To form the connections between the radially-movable carriage and the movable clutch-sections, so as to give the latter the necessary movement longitudinally of the shaft, the wheel D is formed with openings $d^4$ just inside of the edge of the clutch-rim, through which pass the neck and shank of the clevises H, Fig. 6. These clevises also pass way through the segments and have suitable nuts and lock-nuts $h'$ on the outer ends.

The bifurcated outwardly-extending arms of the clevises H pass through notches $f^2$ in the cap-plates $f$ and embrace the said carriages. Short links or, more properly speaking, toggle-arms I are pivoted on the cross-pieces $h^2$ of the clevises, and are similarly connected to the carriages by means of pins $i$, the arrangement being such as that when the collar G is pushed in and the radial carriages outward the toggle-arms will force the sections of the clutch together, gripping the annular clutch-rim firmly between them.

To relieve the strain on the operating mechanism, the toggle-arm may, when the clutch is tightest, be just over its center, where there is no tendency to move in either direction, and if it is moved slightly beyond its center a lock will be formed which will hold the clutch-segments in engagement, as will be readily understood.

The movable sections of the clutch are preferably separated promptly when the carriages are moved inward by means of small coiled springs $i'$, and in order to give better friction-surfaces between the clutch members the wheel-rim $d$ and clutch-segments are preferably recessed and faced with fiber or wood $d^5$, while the clutch-rim is dressed smooth on both sides, permitting the fiber to come directly into contact with the iron, and thereby securing the best friction-surfaces with the least possible wear.

At one side of the drum, preferably in line with the brake-band recess $b'$, the bed-plate is provided with an upright or casing M, in which are journaled two vertical shafts M' M², having corresponding hand-wheels $m'$ $m^2$ and adapted to operate the clutch and brake-band, respectively, through connections to be now described. The shaft M² carries at its lower end a worm-gear N, which meshes with and is adapted to operate a worm or brake-band segment N', pivoted in projections of the standard M and having connected thereto the end or ends of the brake-band $n$. The opposite end or ends of it may be connected to the bed-plate at the opposite side by links $n'$. In forming the connections between the ends of the brake-band and the links $n'$, I preferably form on said band a series of teeth $n^2$, Figs. 7 and 8, which are adapted to engage and co-operate with a corresponding series of teeth $n^3$ on the links, suitable bolts or screws $n^4$ being provided to hold the parts in engagement. Now when it is desired to take up wear on the brake-band it is only necessary to loosen the screws $n^4$, advance the end of the band one or more teeth, and tighten the screws up. As the strain on the screws is practically nothing, they may be very light and do not interfere in the least with the working of the band, and, besides, the construction forms a much stronger joint than those heretofore employed.

The shaft M' passes down through the shaft M² and carries upon its lower end a beveled pinion O, which meshes with a corresponding pinion O' on a short shaft $o'$, journaled in the bed-plate and carrying at its outer end a gear $o$, which communicates its motion through an idler $o^2$ to a gear O² on the end of a shifter-shaft P. This latter shaft is supported in bearings $p$ upon the bed-plate, and is provided with crank-arms P', having studs or equivalents passing into the groove P² of the collar G.

In operation it will be seen that the engineer has both the brake and clutch mechanism under his immediate control and can operate either without moving from his position on the bed-plate or a platform thereon.

To take up wear or to lock the brake in set position the upper end of the standard M is slit and a screw Q, provided with a hand-wheel $q$, unites the parts in such manner that they may be readily separated and drawn together.

Wear on the segment or rim of wheel D may be compensated for by setting up nuts on the shanks of the clevises, four of which are shown in the present illustration; but it will be understood that I do not wish to be limited to any particular number, as it is obvious that one will accomplish the end sought in a more or less perfect manner, and that any desired number can be employed, limited only by the area of the wheel. It will also be understood that while I have shown the clutch-rim on the drum and the movable clutch members on the independent wheel or hub it is obvious that the relative arrangement may be reversed without departing from the spirit of my invention.

Having thus described my invention, what I claim as new is—

1. In a friction-clutch, the combination, with the clutch-rim and the clutch members adapted to contact with said rim at both sides, of the radially-movable carriage and connections between said carriage and one of said clutch members for moving the same toward the clutch-rim, and means for sliding said carriage radially, substantially as described.

2. In a friction-clutch, the combination, with the clutch-rim and the clutch members adapted to contact with said rim on opposite sides, of the radially-sliding carriage mounted on one of said members and a connection between said carriage and the opposite clutch member for drawing the members together and means for moving the carriage, substantially as described.

3. In a friction-clutch, the combination, with the clutch-rim and clutch members adapted to contact with said rim on opposite sides, of the radially-sliding carriage with means for moving the same radially, the clevis connected to one of said clutch members, and the toggle-link uniting said clevis and carriage, substantially as described.

4. In a friction-clutch, the combination, with the annular clutch-rim, the clutch members adapted to contact with said rim on both sides, and the radially-moving carriage mounted on one of said members, of the clevis passing through said last-mentioned member and connected to the opposite member, the toggle-link connecting the carriage and clevis, and means, substantially as described, for moving the carriage radially, as set forth.

5. In a friction-clutch, the combination, with the annular clutch-rim and clutch members adapted to contact with the same at opposite sides and the radially-movable carriage, of the clevis adjustably connected to one of said members and passing through the other member, the toggle-link connecting said carriage and clevis, and means for moving the carriage radially, substantially as described.

6. In a friction-clutch, the combination, with the friction-rim, the wheel having its rim lying parallel with and in proximity to said clutch-rim, the clutch-segment pivotally connected to said wheel, and the radially-movable carriage mounted in ways on the wheel, of the clevis connected to the segment and passing through the wheel and the toggle-link connecting said clevis and carriage, substantially as described.

7. In a friction-clutch, the combination, with the clutch-rim, the wheel having its rim in proximity to said clutch-rim, a clutch-segment pivoted to said wheel, and the radially-movable carriage mounted in ways on the wheel, of the clevis passing through both the wheel and segment, the nut on the inner end of the clevis, and the toggle-link connecting the outer end of the clevis and carriage, substantially as described.

8. In a friction-clutch for hoisting-drums, the combination, with the drum having the inwardly-extending clutch-rim, the wheel mounted on the shaft and having its rim in proximity to the clutch-rim, the radially-movable carriage mounted thereon, and the clutch-segment pivoted to said wheel and lying in proximity to the opposite side of the clutch-rim, of the clevis connected to the clutch-segment and passing through the wheel, the toggle-link connecting said clevis and carriage, and the sliding collar and link for moving the carriage radially, substantially as described.

9. The combination, with the hoisting-drum having the inwardly-extending clutch-rim secured to the end thereof, the wheel mounted on the shaft and having its rim in proximity to said clutch-rim, the radially-movable carriage mounted in ways thereon, and a clutch-segment lying in proximity to the clutch-rim pivoted to the wheel, of the clevis connected to the clutch-segment and having the bifurcated end embracing the carriage, the toggle-link connecting said clevis and carriage, and the sliding collar and link for moving the carriage radially, substantially as described.

10. The combination, with the brake-band having a series of teeth formed thereon, of the connecting-link for the end of said band having a corresponding co-operating series of teeth thereon and the screws for holding said teeth in engagement, substantially as described.

FRANK H. BREWSTER.

Witnesses:
J. S. RUNCIMAN,
VALANCEY S. FULLER.